United States Patent [19]
Choi et al.

[11] Patent Number: 5,708,643
[45] Date of Patent: Jan. 13, 1998

[54] MULTIPLE FOCUS OPTICAL PICKUP SYSTEM FOR ALTERNATIVELY READING A MULTIPLE NUMBER OF OPTICAL DISKS

[75] Inventors: Yang-Oh Choi; Ki-Tae Kim, both of Seoul, Rep. of Korea

[73] Assignee: Daewoo Electronics Co., Ltd., Seoul, Rep. of Korea

[21] Appl. No.: 719,809

[22] Filed: Sep. 25, 1996

[30] Foreign Application Priority Data

Sep. 29, 1995 [KR] Rep. of Korea .................. 95-32791

[51] Int. Cl.$^6$ .......................................... G11B 7/00
[52] U.S. Cl. ............................................. 369/112
[58] Field of Search .................. 369/112, 54, 58, 369/94, 44.12, 53, 100, 103, 109, 110, 118, 120

[56] References Cited

U.S. PATENT DOCUMENTS

| | | |
|---|---|---|
| 5,097,464 | 3/1992 | Nishiuchi et al. .................. 369/112 |
| 5,235,581 | 8/1993 | Miyagawa et al. ............... 369/112 X |
| 5,446,565 | 8/1995 | Komma et al. ..................... 369/94 X |

FOREIGN PATENT DOCUMENTS

| | | |
|---|---|---|
| 0610055 | 8/1994 | European Pat. Off. . |
| 0731458 | 9/1996 | European Pat. Off. . |
| 62-15406 | 8/1994 | Japan . |

OTHER PUBLICATIONS

Yoshiaki Komma et al."Dual Focus Optical Head For 0.6mm and 1.2mm Disks",Proceedings of the SPIE–1994 Topical Meeting on Optical Data Storage,vol.2338, pp.282–288,16–18 May 1994.

*Primary Examiner*—Paul W. Huber
*Attorney, Agent, or Firm*—Anderson Kill & Olick, P.C.

[57] ABSTRACT

An optical pickup system for alternatively detecting an information signal from, e.g., a pair of optical disks loaded on a disk tray is described, wherein each of the optical disks may have a different thickness. The optical pickup system includes a light source for generating a light beam and an optical device provided with a first and a second parts, wherein a portion of the light beam impinging onto the first part is focused onto the first optical disk, and the remaining portion of the light beam impinging onto the second part is focused onto the second optical disk, thereby allowing the optical pickup system to detect an information signal from the respective optical disk.

9 Claims, 2 Drawing Sheets

MULTIPLE FOCUS OPTICAL PICKUP SYSTEM FOR ALTERNATIVELY READING A MULTIPLE NUMBER OF OPTICAL DISKS

FIELD OF THE INVENTION

The present invention relates to an optical pickup system; and, more particularly, to an improved optical pickup system capable of reading a multiple number of optical disks loaded on a disk tray.

DESCRIPTION OF THE PRIOR ART

As is well known, a short wavelength light source and a large numerical aperture (NA) are important optical factors in optical pickup heads for realizing a high density optical storage. A large NA lens, e.g., 0.6, is preferably used with a thin optical disk of thickness of, e.g., 0.6 mm, and if an optical head intended to read the thin optical disk is used to read a thicker conventional 1.2 mm disk, the spherical aberration caused by the difference in the thicknesses of the two disks must be corrected. For this purpose, therefore, a dual focus optical head with a holographic optical element (HOE) has been introduced.

In FIG. 1, there is shown a dual focus optical head 100 for reproducing information signals stored on a thin and a thick optical disks alternately loaded on a disk tray, wherein each of the optical disks has a corresponding recording surface, as described in Kanda and Hayashi, "Dual Focus Optical Head for 0.6 mm and 1.2 mm Disks", *SPIE Vol. 2338 Optical Data Storage* (1994)/283. The dual focus optical head 100 includes: a light source 126 for generating a light beam, a beam splitter 106, a collimate lens 108, a HOE 110, an objective lens 112, a cylindrical lens 104 and a detector 102 provided with four photoelectric cells, wherein the HOE 110 is designed as a concave lens in such a way that the focal length of a +1st order diffracted light beam 128 is farther from the objective lens than that of a 0th order diffracted light beam 124.

In the optical head 100, when a thin optical disk 116 is loaded on the disk tray, the 0th order diffracted light beam 124 transmitted through the HOE 110 is utilized for reproducing the information signal from a recording surface 118 of the thin optical disk 116. In this case, the light beam emitted from the light source 126, e.g., a laser diode, enters the HOE 110 via the beam splitter 106 for partially reflecting the light beam on its surface and the collimate lens 108 for making the reflected light beam from the beam splitter 106 to be parallel, wherein the HOE 110 simply plays the role of a parallel plate for the 0th order diffracted parallel light beam 124. The 0th order diffracted parallel light beam 124 is focused on the recording surface 118 of the thin optical disk 116 by the objective lens 112. When the 0th order diffracted parallel light beam 124 is returned from the thin optical disk 116 to the HOE 110 via the objective lens 112, the HOE 110 plays again the role of a parallel plate. The 0th order diffracted light beam 124, after passing through the collimate lens 108 and the beam splitter 106, becomes astigmatic by passing through the cylindrical lens 104, allowing the detector 102 to read the information signal from the recording surface 118 of the thin optical disk 116.

Meanwhile, in order to reproduce the information signal from a recording surface 120 of a thick optical disk 122, the +1st order diffracted light beam 128 transmitted through the HOE 110 is used and all the optical components in the optical head 100 except the HOE 110 function in the same way for the +1st order diffracted light beam 128 as for the 0th order diffracted light beam 124. In this case, the HOE 110 functions as a lens for focusing the +1st order diffracted light beam 128 on the recording surface 120 of the thick optical disk 122 in combination with the objective lens 112. Therefore, the optical head 100 intended for use with the thin optical disk 116 is capable of reproducing the information signal from the recording surface 120 of the thick optical disk 122.

One of the major shortcomings of the above-described optical head 100 is the size thereof, arising from the use of the HOE 110, which, in turn, requires the objective lens 112 to serve as a lens and the collimate lens 108 to be used in making the light beam from the beam splitter 106 to be parallel, thereby making the optical head 100 bulky and structurally complicated.

Further, since the prior optical head 100 utilizes an astigmatic method, it requires that a cylindrical lens 104 be incorporated therein for detecting a focusing signal to thereby make the optical head 100 complicated.

SUMMARY OF THE INVENTION

It is, therefore, a primary object of the present invention to provide an improved optical pickup system capable of reading a plurality of optical disks having some or all different thicknesses.

In accordance with the present invention, there is provided an optical pickup system for selectively detecting a focusing signal from one of N optical disks loaded on a disk tray, wherein each of the optical disks has a respective recording surface and thickness different from each other, N being a positive integer, said system comprising: a light source for generating a light beam; a beam splitter for reflecting a portion of the light beam to the recording surface of a selected optical disk; an optical device provided with N parts, each of the parts having a different focal length corresponding to said each of the optical disks, for dividing the reflected light beam into N portions and focusing each portion of the reflected light beam on the recording surface of the selected optical disk, respectively; and a detector for measuring the intensity of light beams reflected from the recording surface of the selected optical disk and generating a corresponding focusing signal.

BRIEF DESCRIPTION OF THE DRAWINGS

The present invention together with the above and other objects and advantages will become apparent from the following description of preferred embodiments, when given in conjunction with the accompanying drawings, wherein.

DETAILED DESCRIPTION OF THE PREFERRED EMBODIMENTS

Figure 1:
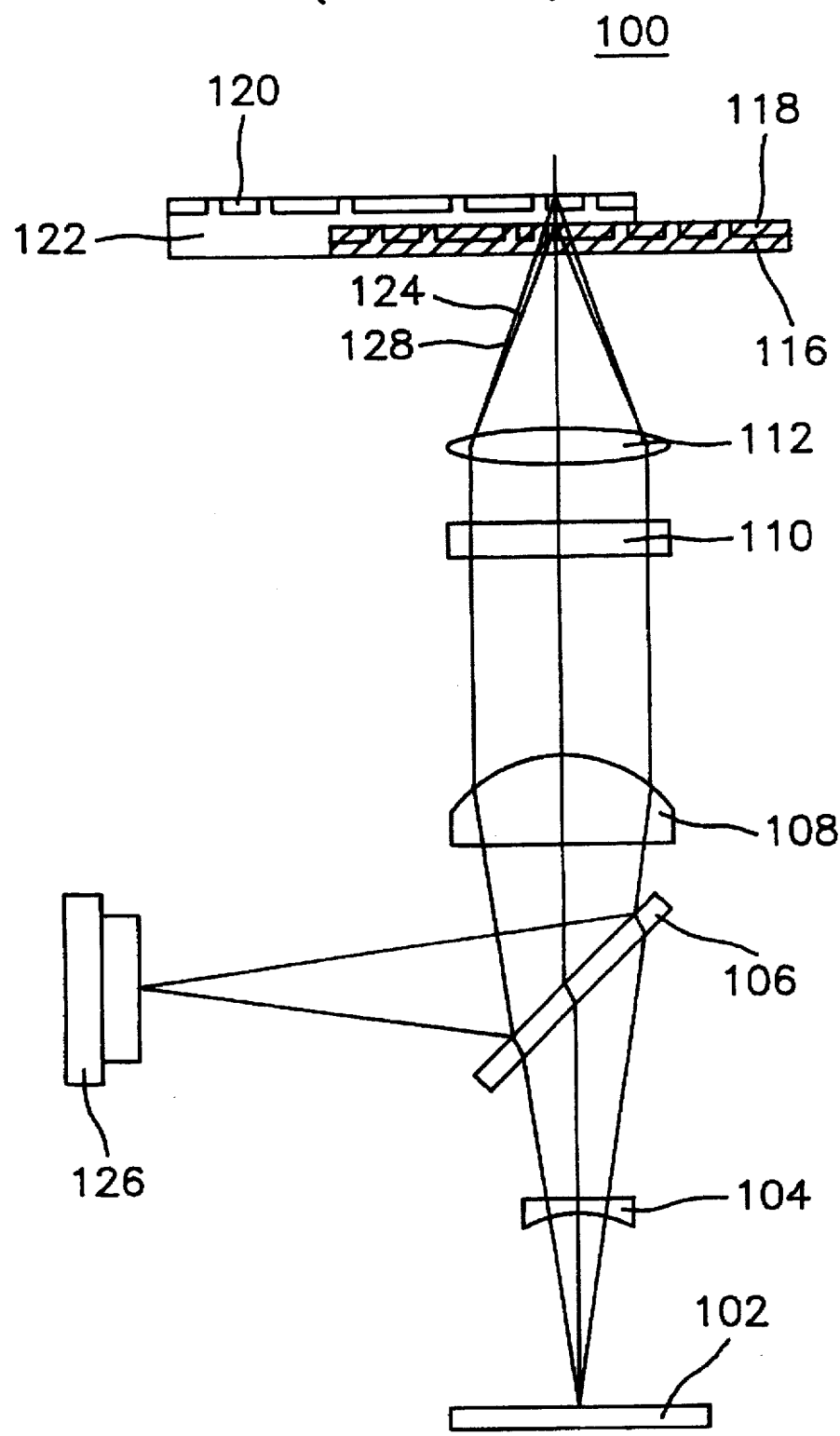
FIG. 1 represents a schematic side view of a prior art optical head.
Figure 2:
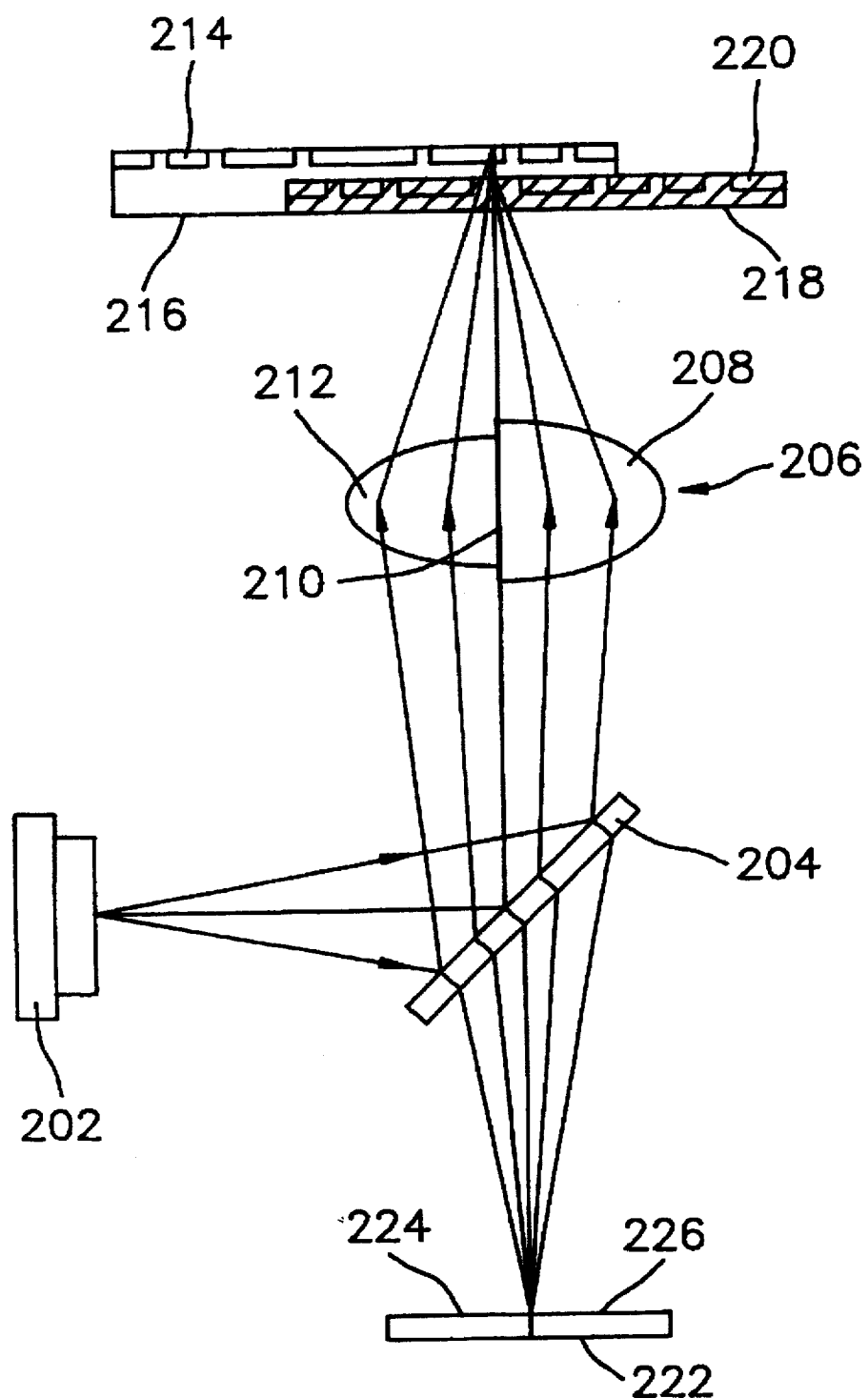
FIG. 2 depicts a schematic side view of an optical pickup system utilizing the inventive optical device.

There is illustrated in FIG. 2 an optical pickup system 200 which includes a light source 202 for generating a light beam, a beam splitter 204 provided with a surface, an optical device 206 and a detector 222 provided with a pair of reception surfaces 224, 226. The optical device 206 is provided with a first and a second parts 208, 212, and a central line 210 serving as a knife edge, wherein the focal length of the second part 212 is longer than that of the first part 208, so that the light beams through the first and the second parts 208, 212 are focused on a first and a second recording surfaces 220, 214, respectively.

There are three different methods and embodiments to manufacture the optical device 206 in accordance with the present invention. In the first method, two parts thereof, each made of different kind of lens material such as glass plastics having different refractive indexes, e.g., PMMA (polymethylmetacryllrate) or PC (polycarbonate), are bonded together by using an adhesive agent and then are polished to make the optical device 206. For the second method, two Fresnel lenses, each of them having a different focal length and being in the form of a semi-circle, are bonded together by an adhesive agent to provide the optical device 206. In the third, parts of the optical device 206 are made of a graded index material having a position dependent refractive index distribution.

In the optical pickup system 200, a thin optical disk 218 having a thickness of, e.g., 0.6 mm, is loaded on the disk tray in such a way that the light beam passing through the first part 208 of the optical device 206 is focused on the first recording surface 220 of the thin optical disk 218. When a light beam emitted from the light source 202, e.g., a laser diode, enters the optical device 206 via the beam splitter 204 which allows the light beam to be partially reflected on its surface, the surface of the beam splitter 204 is so arranged to be inclined at a predetermined angle with respect to an optical axis formed by a central point of the detector 222 and the focal point in the respective recording surface. It is preferable that the predetermined angle be 45 degrees.

The light beam passing through the optical device 206 is divided into a first and a second portions transmitted through the first and the second parts 208, 212 of the optical device 206, respectively. When the first portion of the light beam is focused on the first recording surface 220 of the thin optical disk 218, the second portion of the light beam will not be focused thereon due to the difference in the focal length between the two parts 208, 212 of the optical device 206. The first portion of the light beam reflected from the first recording surface 220 is transmitted through the second part 212 of the optical device 206 having a longer focal length than that of the first part 208 thereof and are then detected via the beam splitter 204 on the reception surfaces 224, 226 of the detector 222, wherein the first portion of the light beam detected is not focused on the reception surfaces 224, 226 of the detector 222, because the first recording surface 220 from which the first portion of the light beam was reflected is closer to the second part 212 than its focal point. The reception surfaces 224, 226 of the detector 222 are capable of measuring the intensity of the light beam detected.

The second portion of the light beam is transmitted through the first part 208 of the optical device 206 after having been reflected from the thin optical disk 218 and is detected via the beam splitter 204 on the reception surfaces 224, 226 of the detector 222, wherein the second portion of the light beam detected is not focused on the reception surfaces 224, 226 of the detector 222, because the light beam was not focused when it was reflected from the first recording surface 220, although the first recording surface 220 was located at the focal length of the first part 208 of the optical device 206. The intensity distributions of each portion of the light beam detected at the detector 222 change in response to the displacement of the thin optical disk 218 from the optical device 206. The detector 222 detects the light intensity distributions of both of the portions transmitted through the beam splitter 204, thereby allowing the detector 222 to read an information signal, e.g., a focusing signal or a regeneration information signal, from the first recording surface 220 of the thin optical disk 218.

Similarly, when a thick optical disk 216 having a thickness of, e.g., 1.2 mm, is loaded on the disk tray so that the second portion of the light beam passing through the second part 212 of the optical device 206 is focused on the second recording surface 214 of the thick optical disk 216, the first portion of the light beam passing through the first part 208 of the optical device 206 is not focused thereon.

In this case, the second portion of the light beam reflected from the thick optical disk 216 is transmitted through the first part 208 of the optical device 206 and is detected via the beam splitter 204 on the reception surfaces 224, 226 of the detector 222, wherein the second portion of the light beam detected on the reception surfaces 224, 226 of the detector 222 is not focused thereon, because the second recording surface 214 from which the second portion of the light beam is reflected is farther away from the first part 208 than its focal point. The first portion of the light beam reflected from the second recording surface 214 of the thick optical disk 216 is transmitted through the second part 212 of the optical device 206 and is detected via the beam splitter 204 on the reception surfaces 224, 226 of the detector 222, wherein the first portion of the light beam detected is not focused on the reception surfaces 224, 226 of the detector 222, because the first portion of the light beam was not focused when it was reflected from the second recording surface 214, though the second recording surface 214 was located at the focal length of the second part 212 of the optical device 206. The intensity distributions of each portion of the light beam detected at the detector 222 change in response to the displacement of the thick optical disk 216 from the optical device 206. The detector 222 detects the light intensity distributions of both portions transmitted through the beam splitter 204, thereby allowing the detector 222 to read an information signal, e.g., a focusing signal or a regeneration information signal, from the second recording surface 214 of the thick optical disk 216.

In comparison with the prior art optical head 100, the inventive optical pickup system 200 is structurally simple, its size being greatly reduced with fewer components, eliminating the objective lens 112, the collimate lens 108 and the cylindrical lens 104 in the prior optical head 100.

Even though the present invention has been described for an optical pickup system incorporating therein an optical device capable of focusing a first and a second portions of a light beam onto a first and a second focal points, respectively, and hence for reading both the thin and the thick optical disks, the idea presented above can be extended to an optical pickup system for use with a number of optical disks having different thicknesses by utilizing therein an optical device capable of focusing a same number of portions of light beam as that of the optical disks on corresponding focal points, respectively.

While the present invention has been described with respect to the preferred embodiments, other modifications and variations may be made without departing from the spirit and scope of the present invention as set forth in the following claims.

What is claimed is:

1. An optical pickup system for selectively reading one of N optical disks loaded on a disk tray, wherein each of the optical disks has a respective recording surface and thickness different from each other, N being a positive even integer, said system comprising:

means for generating a light beam;

beam splitting means for partially reflecting the light beam to the recording surface of a selected optical disk; and an optical device provided with N parts, each of the parts having a different focal length from each other to be able to focus light beam onto a corresponding optical disk, for dividing the reflected light beam into N portions, wherein one of N portions of the reflected light beam is focused on the recording surface of the selected optical disk after being transmitted through a part selected from the N parts of the optical device and then is reflected onto a part opposite to the selected part.

2. The optical pickup system of claim 1 which further comprises detecting means, wherein the detecting means has a pair of reception surfaces capable of measuring a light beam intensity.

3. The optical pickup system of claim 2, wherein each portion of the divided light beams, reflected from the recording surface of the selected optical disk to the optical device is impinged via the beam splitting means onto the pair of reception surfaces.

4. The optical pickup system of claim 3, wherein the beam splitting means is disposed between the optical device and the detecting means.

5. An optical pickup system for reading an information signal recorded on a recording surface of a selected one of a first and a second optical disks, the optical disks being disposed such that distances between the optical pickup system and the recording surfaces of the optical disks are different from each other, said optical pickup system comprising:

means for generating a light beam;

means for detecting an intensity of a light incident thereon; and an optical device provided with a first and a second optical means, each of the optical means being divided by a central line and having different focal length, wherein a fraction of the light beam is delivered to the recording surface of the selected optical disk via one of the optical means and a reflected light beam from the recording surface of the selected optical disk is delivered to the detection means via the other optical means.

6. The optical pickup system of claim 5, further comprising beam splitting means for partially reflecting the light beam from the generation means, thereby providing said fraction of the light beam.

7. The optical pickup system of claim 6, wherein said beam splitting means is disposed between the optical device and the detection means.

8. The optical pickup system of claim 5, wherein said detection means has a pair of reception surfaces.

9. The optical pickup system of claim 5, wherein the central line of the optical device serves as a knife edge.

* * * * *